(12) United States Patent
Catling

(10) Patent No.: US 7,004,540 B2
(45) Date of Patent: Feb. 28, 2006

(54) SEAT FOR CYCLIST

(75) Inventor: Jon Catling, Cambridgeshire (GB)

(73) Assignee: Manta Design Ltd., Cambridge (GB)

( * ) Notice: Subject to any disclaimer, the term of this patent is extended or adjusted under 35 U.S.C. 154(b) by 0 days.

(21) Appl. No.: 10/475,893

(22) PCT Filed: Mar. 26, 2002

(86) PCT No.: PCT/GB02/01175

§ 371 (c)(1),
(2), (4) Date: Jan. 8, 2004

(87) PCT Pub. No.: WO02/087954

PCT Pub. Date: Nov. 7, 2002

(65) Prior Publication Data

US 2004/0239157 A1    Dec. 2, 2004

(30) Foreign Application Priority Data

Apr. 27, 2001   (GB)   .................... 0110369

(51) Int. Cl.
*B62J 1/00* (2006.01)

(52) U.S. Cl. .......... 297/201; 297/197; 297/312
(58) Field of Classification Search ........... 297/201, 297/202, 197, 311, 312, 215.13, 215.15, 195.1
See application file for complete search history.

(56) References Cited

U.S. PATENT DOCUMENTS

| 4,089,559 A | * | 5/1978 | Prange et al. ........... 297/201 X |
| 4,541,668 A | * | 9/1985 | Rouw .................... 297/201 |
| 5,863,094 A | * | 1/1999 | Endo ..................... 297/201 X |
| 6,152,524 A |  | 11/2000 | Cox |

FOREIGN PATENT DOCUMENTS

| EP | 816214 | 1/1998 |
| WO | WO9942353 | 8/1999 |
| WO | WO0051877 | 9/2000 |

* cited by examiner

*Primary Examiner*—Anthony D. Barfield
(74) *Attorney, Agent, or Firm*—Dann, Dorfman, Herrell and Skillman, P.C.

(57) ABSTRACT

A seat for a cyclist has at each of left and right sides thereof one or more movable leg support members. In use, the support members at one side rise and fall out of phase with the support members at the other side

4 Claims, 3 Drawing Sheets

Figure 1:
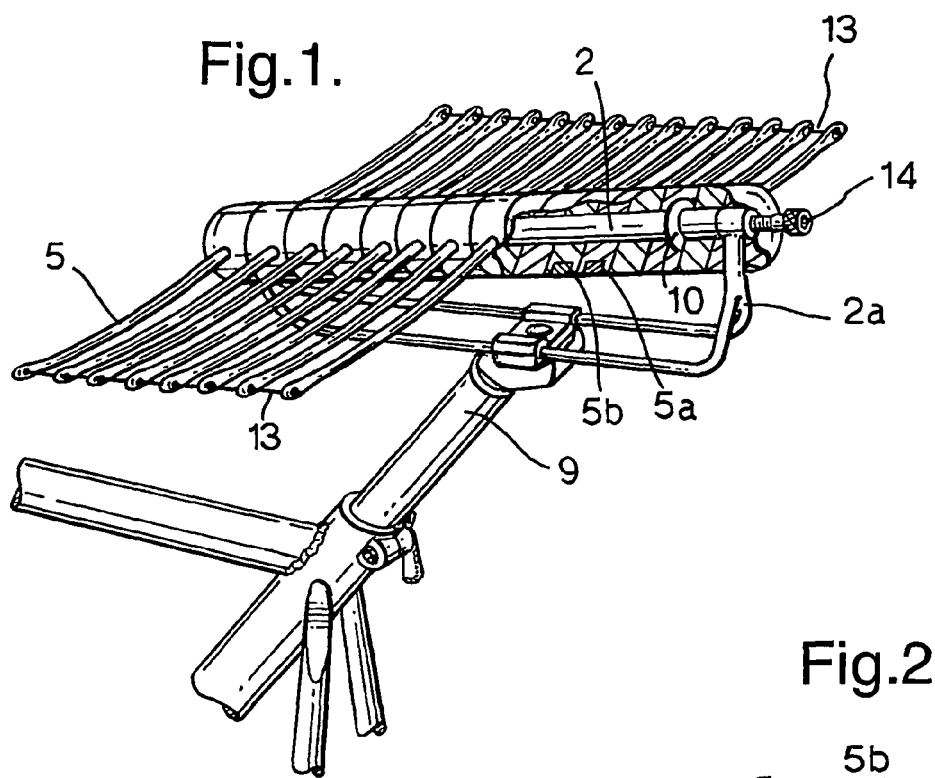

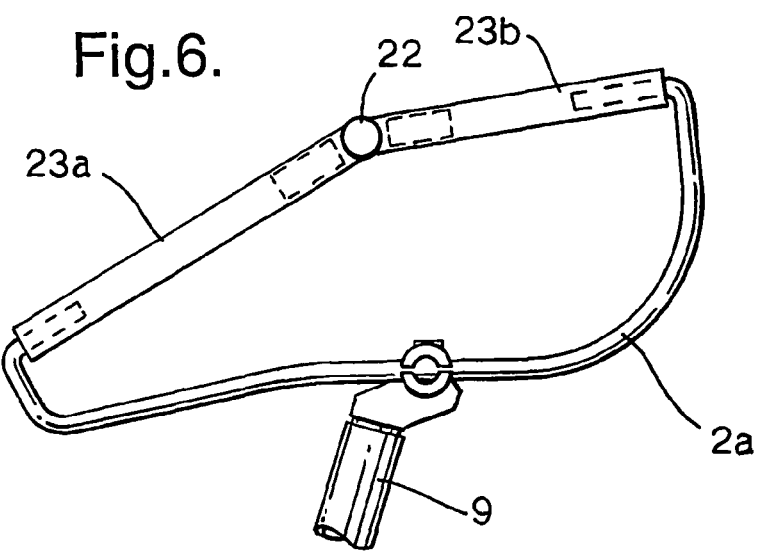
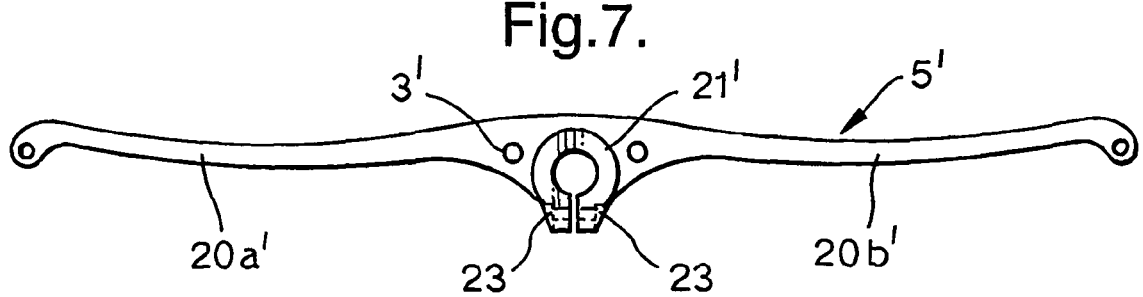
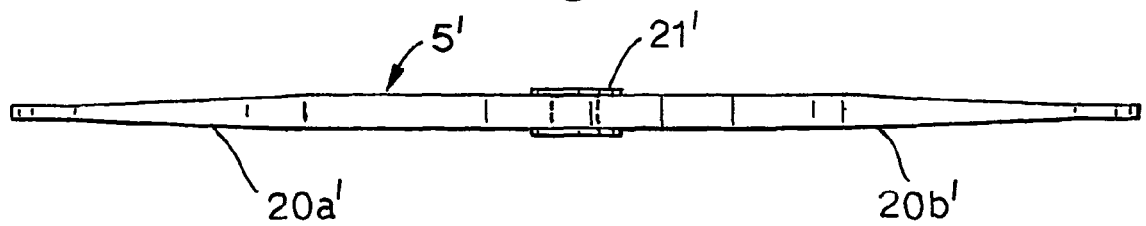
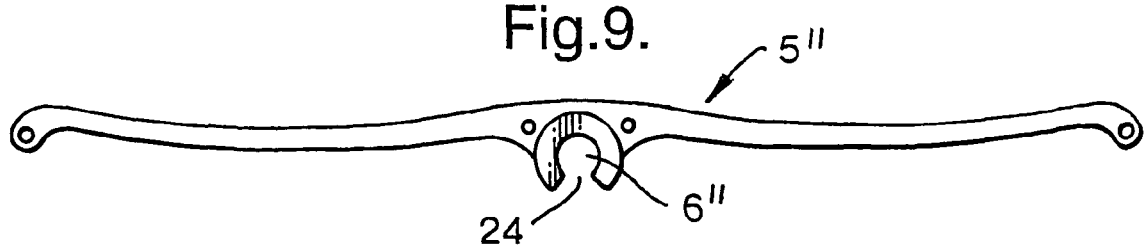

SEAT FOR CYCLIST

The present invention relates to a seat for a cyclist, for example a bicycle seat.

Conventional bicycle seats used on "safety" bicycles place a great deal of the rider's body weight on a very small support platform, which can cause discomfort to the rider.

Attempts have been made to overcome this problem by providing larger seats, e.g. of the "mattress" variety, but these tend to restrict movement of the rider's legs.

An object of the present invention is to provide a seat which allows a rider's legs and the buttocks to move freely whilst providing a relatively large area of support over the thighs and buttocks.

A first aspect of the present invention provides a seat for a cyclist, the seat having at each of left and right sides thereof one or more leg support members which are movable so that, in use, the support members at one side rise and fall out of phase with the support members at the other side.

The seat may be suitable for fitting to a bicycle, a tricycle, a stationary cycling exercise apparatus, a pedal-powered boat, or any other apparatus or device powered or operated by cycling motion of a user's legs.

By providing movable leg supports, the seat spreads the weight of the cyclist over a larger area, helping to increase rider comfort but without significantly restricting leg mobility.

The leg support members may be adapted so that at least the upper quarter (and preferably the upper third or half) of each of the cyclist's thighs is supportable.

The leg support members may be adapted to provide, in use, substantially continuous support for the cyclist's legs.

Preferably the support members at one side rise and fall out of phase with the opposing support members at the other side.

Preferably, opposing left and right side support members are coupled so that, in use, downward movement of the support members at one side drives the opposing support members at the other side upward. In this way the downward movement of one leg assists the upward movement of the other leg. This promotes a smooth cycling action and further helps to provide continuous support for each leg.

Preferably, the seat further has a central body from which each of the left and right side support members laterally extends, each support member being pivotally attached to the central body.

The seat may have a plurality of support members at each of the left and right sides of the seat, the support members being arranged so that, in use, the support members of each side are spaced along the respective leg. Preferably the seat has at least five (and more preferably at least ten) spaced support members at each of the left and right sides of the saddle. By providing spaced support members, the seat can adapt better to the varying angles and positions which the legs undergo during cycling. Thus, support members which support the leg e.g. at mid-thigh can undergo greater amounts of movement than support members which support the leg e.g. close to the buttocks. Gaps can be provided between adjacent support members to promote air flow to the legs and thereby improve ventilation. Also the seat may further have restoring means to restore the support members of each side to a predetermined position relative to each other after use.

The support members may be adopted so that they are remountably detachable from the seat, e.g. in case of an accident to reduce the risk of the members inflicting injury on the rider.

A further aspect of the present invention provides a seat (such as a bicycle seat) with a number of articulated elements independently pivoted around a pivot-rail to allow the associated movement of seated area with the leg movement whilst supporting the rider's weight. The elements may be replaceable with similar elements of different materials/sizes/flexibility. The seat may have a number of flexible elements, or otherwise, that describe the seated area. The seat may be made of metals, plastics or wood or a combination of these materials. The seat may have a detachable rail to enable the elements to be changed.

Any one of any combination of the optional features of one of the previous aspects of the invention may be applied to the other aspect of the invention.

Figure 2:
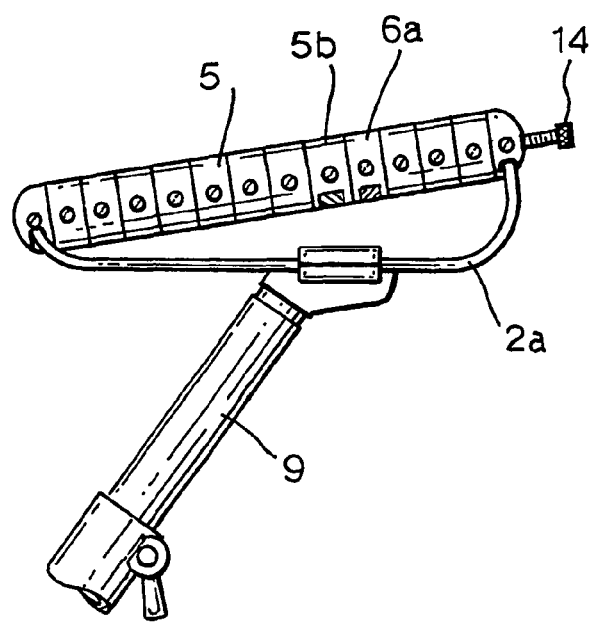
Figure 3:
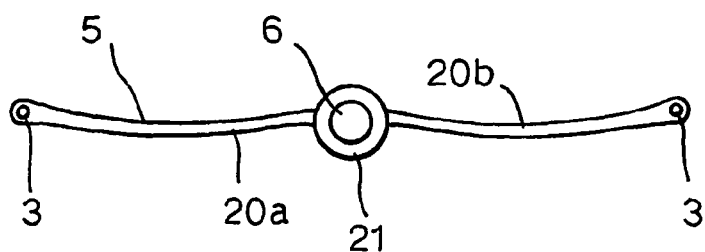
Figure 4:
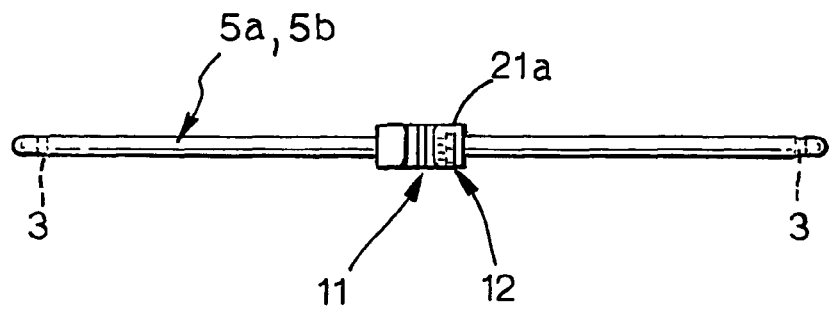
Figure 5:
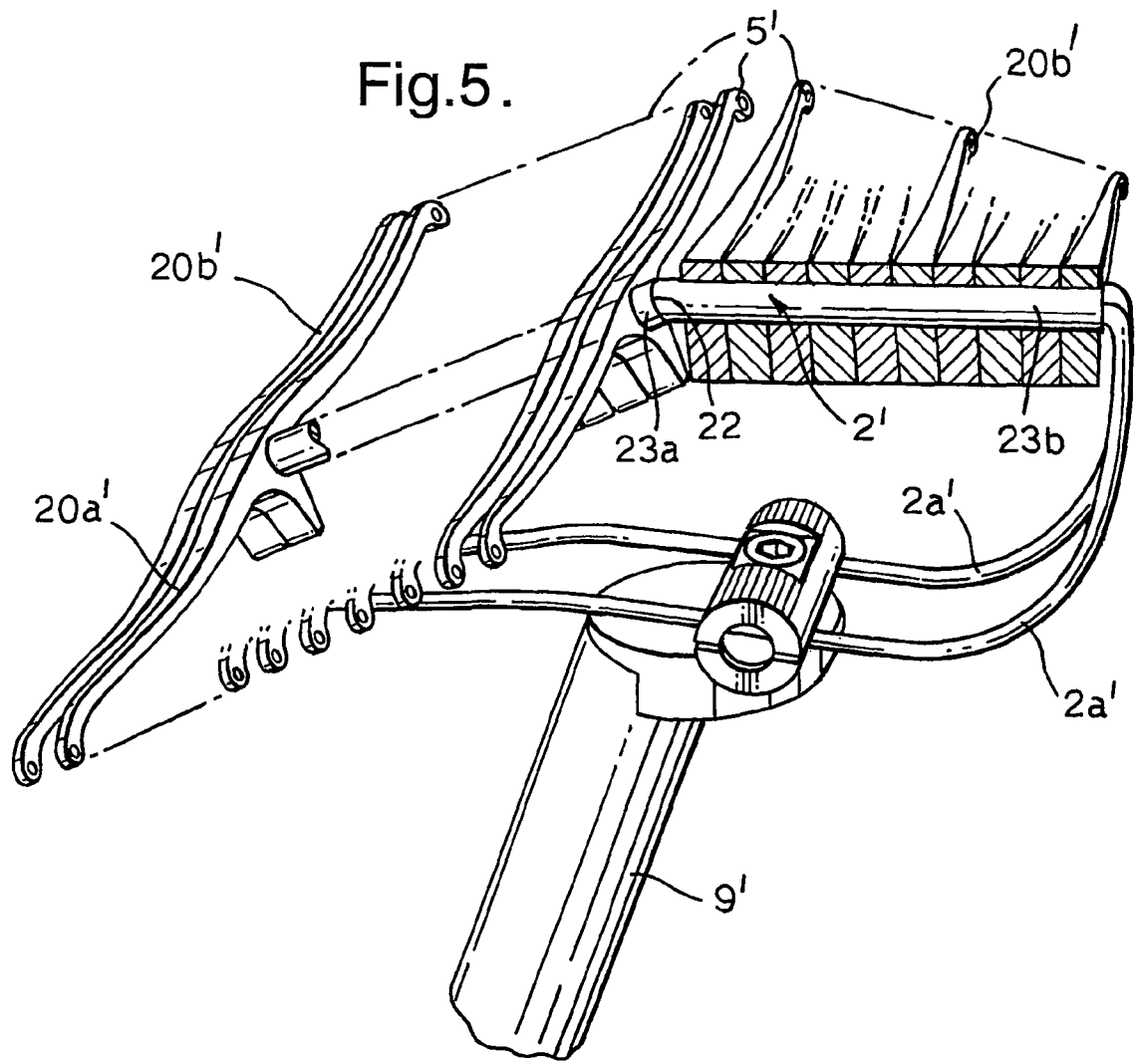

The invention will now be described in relation to specific embodiments and with reference to the following figures in which:

FIG. 1 shows a perspective view, with a cut away section, of a seat according to a first embodiment, the seat being positioned on a bicycle, FIG. 2 shows a side view of the seat of FIG. 1, FIG. 3 shows an end view of a single pivotable element of the seat of FIG. 1, FIG. 4 shows an under side view of a single non-pivotable element of the seat of FIG. 1, FIG. 5 shows a perspective view of a seat, according to a second embodiment, positioned on a seat post with a cut away section, FIG. 6 shows a side view of the pivot-rail of the seat of FIG. 5, FIG. 7 shows an end view of a single element of the seat of FIG. 5, FIG. 8 shows a top side view of the element of FIG. 7, and FIG. 9 shows an end view of an alternative single element for the seat of FIG. 5.

FIG. 1 shows a perspective view, with a cut away section, of a first embodiment of a seat, and FIG. 2 shows a side view of the seat of FIG. 1.

The seat comprises a plurality of elements 5 that are supported on and are pivotable around a central body which takes the form of pivot-rail 2. The pivot-rail is held by bolts 14 (the front end bolt is not shown, and the rear end bolt is shown partly withdrawn for clarity) to the ends of support rails 2a that are clamped to a conventional bicycle seat post 9.

As shown in FIG. 3 (which is an end view of a single element 5 of the seat of FIG. 1) each element 5 has two elongate support arms 20a, 20b which extend radially from opposite sides of central tubular portion 21. The bore 6 of tubular portion 21 of each of the elements receives pivot-rail 2 and forms a bearing surface. Optional low friction washers 10 (only one is shown in FIG. 1) are positioned between neighbouring tubular portions on the pivot-rail. Thus the pivot-rail provides an axis about which the support arms can rotate substantially independently of each other, with support arms 20a, 20b extending laterally from the pivot-rail at left and right sides of the seat. The washers can be omitted if the axially outer faces of the tubular portions are of sufficiently low friction material or sufficiently lubricated to allow the substantially independent rotation.

Elements 5a and 5b, however, are non-pivotably fixed to the pivot-rail. FIG. 4 shows an under side view of one of these elements. Recessed pinch bolts 12 in tubular portion 21a clamp the element to the pivot-rail so that the respective support arms cannot rotate. These non-rotating arms provide lateral stability for the rider.

The elements 5 provide a seating area which includes moveable support for the rider's upper thighs and posterior. The rider's posterior (i.e. buttocks) is supported by the support arms rearwards of elements 5a and 5b, and the upper thighs (down to about mid-thigh) are supported by the support arms forward of these elements. The lateral extents of the arms can vary to correspond to the seating area of the rider.

Opposing arms on the same element are coupled via the respective central tubular portion, so that as one arm is driven down it assists the upward movement of the opposing arm. Thus the support arms at one side rise and fall out of phase with the opposing support arms and provide continuous support for the cyclist's legs. The movement of each arm is substantially independent of the movement of neighbouring arms so that the arms can adapt and conform to the instantaneous position of the rider's legs.

The outer end of each support arm 20a, 20b has a through-hole 3 through which an elastic cable 13 is threaded. One such cable connects the outer ends of the left side support arms and another connects the outer ends of the right side support arms to define respectively the left and right hand edges of the seating area. Effectively, the elastic cables form restoring means which do not substantially interfere with the rotation of elements 5, but act to restore the support members of each side to an in-line position after use.

FIG. 5 shows a perspective view, with a cut away section, of a seat according to a second embodiment. Like the first embodiment, the seat comprises a plurality of elements 5' that are supported on pivot-rail 2'. The pivot-rail is attached to the ends of support rails 2a' that are clamped to a conventional bicycle seat post 9'.

In this embodiment, however, the pivot-rail has front 23a and rear 23b portions joined by a knuckle joint 22. This is shown more clearly in FIG. 6 which is a side view of the pivot-rail of FIG. 5. The front portion carries elements intended to support the thighs of a rider, and the rear portions carries elements intended to support the posterior of the rider. The knuckle joint allows the angle between the two portions to be varied thereby providing a degree of customisability to further enhance rider comfort. The varying angle changes the overall length of the pivot-rail, but this (small) length change can be accommodated by the flexibility of the support rails and/or be taken up by the pivot-rail/support rail coupling. To correspond with the shape of the rider's posterior, the support arms 20a', 20b' of the elements carried by the rear portion of the pivot-rail have progressively narrower spans towards the rear of the seat.

FIGS. 7 and 8 show respectively end and top views of an element 5' of the seat of FIG. 5. The element 5' is formed as a one-piece plastics mouldings, such that the support arms 20a', 20b' are unitary with central tubular portion 21'. The plastics material has a sufficiently low friction coefficient such that spacing washers are not required between neighbouring elements. Through-holes 3' for receiving a respective elastic restoring cable (not shown) are at the inner ends of support arms 20a', 20b'.

The elements 5' carried by the front portion of the pivot-rail are pivotably attached to the rail such that they can rotate substantially independently of each other to provide continuous support for the rider's legs. On the other hand, the elements carried by the rear portion of the pivot rail are non-pivotably fixed to the rail to provide lateral support for the rider. The fixing can be by means of pinch-bolts through apertures 23 in the central tubular portions 21' of elements 5'. Other means of providing a non-pivotable fixing are known to the skilled person.

FIG. 9 shows an end view of an alternative element 5" for the seat of FIG. 5. In this case the element (or at least central tabula portion 21") is made of a sufficiently resilient material such that the element can be snap-fitted onto pivot-rail by means of the opening 24 in bore 6". In case of an accident, this allows the element to detach from the pivot-rail, reducing the danger of injury to the rider. The seat may incorporate both elements 5' and elements 5", the former e.g. providing non-pivotable lateral support where needed, and the latter being used at other positions.

Alternatively, the rear portion of the pivot-rail and associated elements 5' and/or elements 5" can be substituted by a stationary platform (that is, stationary relative to the up and down motion of the rider's legs) e.g. approximating in shape to the rear half of a conventional saddle.

Further embodiments relate to an articulated bicycle seat with moveable elements that pivot about a rail in line with the top tube, the rail approximating conventional seat height.

The articulation provides a moveable support platform that acts in accordance with the movement of the legs. This is achieved by having multiple rods/elements, independently pivoted in their centres and running from left to right in relation to the rider. The elements pivot around a central pivot-rail that describes the axis of movement for all the moveable parts, the rail being in line with the top tube of the bicycle. Thus, in use, as one thigh descends, the other thigh is supported as it rises, by all elements independently.

A variable amount of springing can also be built in by using a mix of materials and material dimensions over an area of support, allowing a high degree of cushioning and tuning of the suspended areas according to the choice of elements. Spreading the rider's weight over a much larger area, with gaps in between for airflow, provides ventilation.

The seat elements can be made of light and flexible material such as (moulded) carbon fibre. The central bearing area can also serve the purpose of providing a raised centre of the seat to position the rider, in itself inhabiting the approximate area that a very slender bicycle seat—such as used in racing seats—would provide. The uppermost part of the bearing area may be surfaced with a resilient elastic material such as a soft rubber or closed cell synthetic foam or gel.

The moveable parts or elements of the supports may consist of rods of a flexible material passing through a central strengthened bearing area, although these could be moulded as one. The number of elements can be tuned to provide the required support and compliance along with the elements, materials and material dimensions.

The pivot-rail, which takes the elements, can be made of a light and rigid material such as a titanium tube. This may itself be supported by flexible titanium rails, that are the same dimensions as commonly used seat rails, in order that the seat can be a direct replacement onto seat posts of known design and hence uses the same range of adjustments fore and aft, up and down, and for the angle to the horizontal.

Not only is the rider positioned by the central axis-bearings but the shape of the elements themselves may have a curve to accommodate the thigh and buttock. The elements' movement may be restricted, to an extent, by an elastic cable running through the end of each element that describes the sides of the seat. One or more further seat elements positioned to the rear of the seat may be fixed in relation to the seat pivot in order to promote lateral stability of the bike and rider.

What is claimed is:

1. A seat for a cyclist having at each of left and right sides thereof a plurality of movable leg support members arranged so that, in use, the support members of each side are spaced along a respective leg of the cyclist, and a central body from which each of the left and right side support members laterally extends, each support member being pivotally attached to the central body, wherein opposing left and right side support members are coupled so that downward movement of the support members at one side drives the opposing support members at the other side upward.

2. A seat according to claim 1, further having restoring means to restore the support members of each side to a predetermined position relative to each other after use.

3. A seat according to claim 1, wherein the support members are remountably detachable from the seat.

4. A seat according to claim 1, further having a stationary buttock platform.

* * * * *